June 20, 1961      E. C. HOLMES      2,989,123
FIRE EXTINGUISHING FOAM PROPORTIONING SYSTEM
Filed May 8, 1959      2 Sheets-Sheet 1
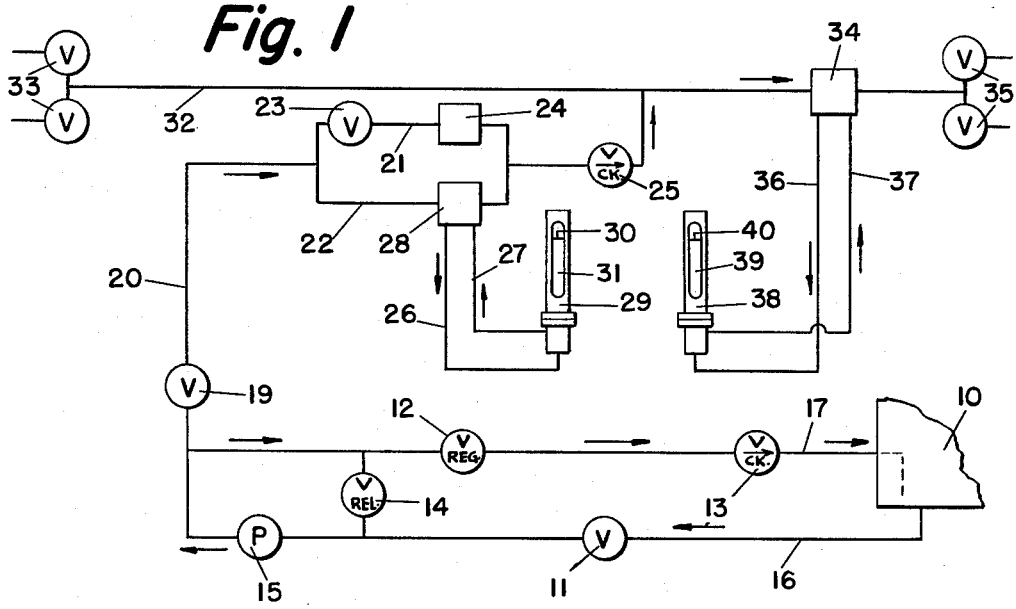
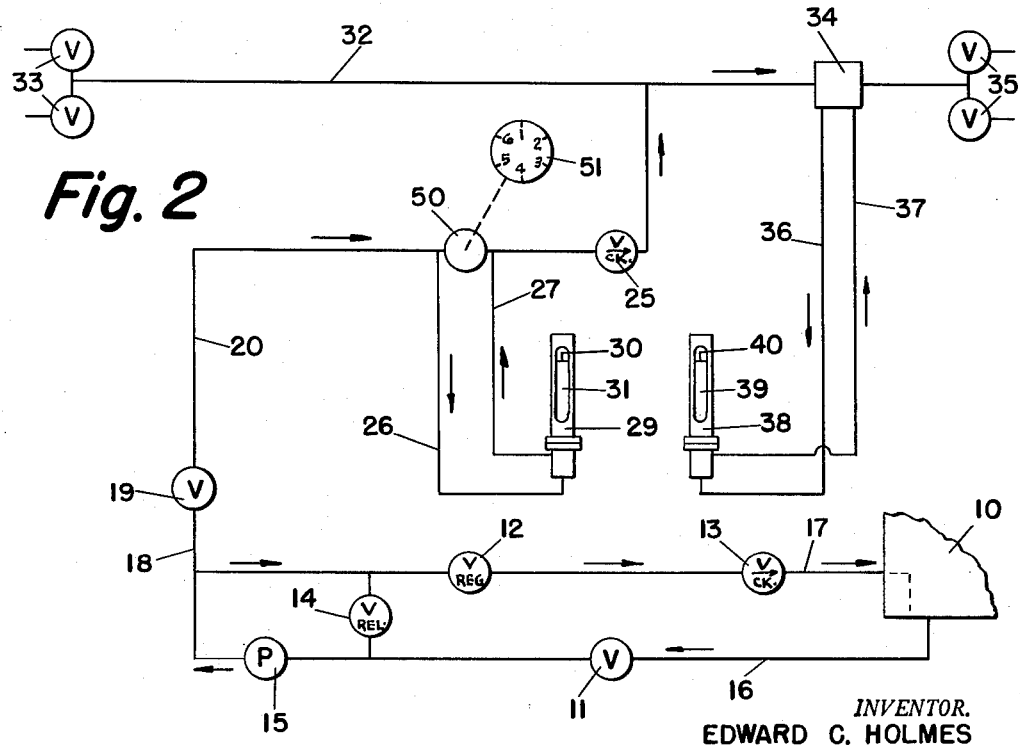
INVENTOR.
EDWARD C. HOLMES
BY *Leo Edelson*
ATTORNEY June 20, 1961 E. C. HOLMES 2,989,123
FIRE EXTINGUISHING FOAM PROPORTIONING SYSTEM
Filed May 8, 1959 2 Sheets-Sheet 2
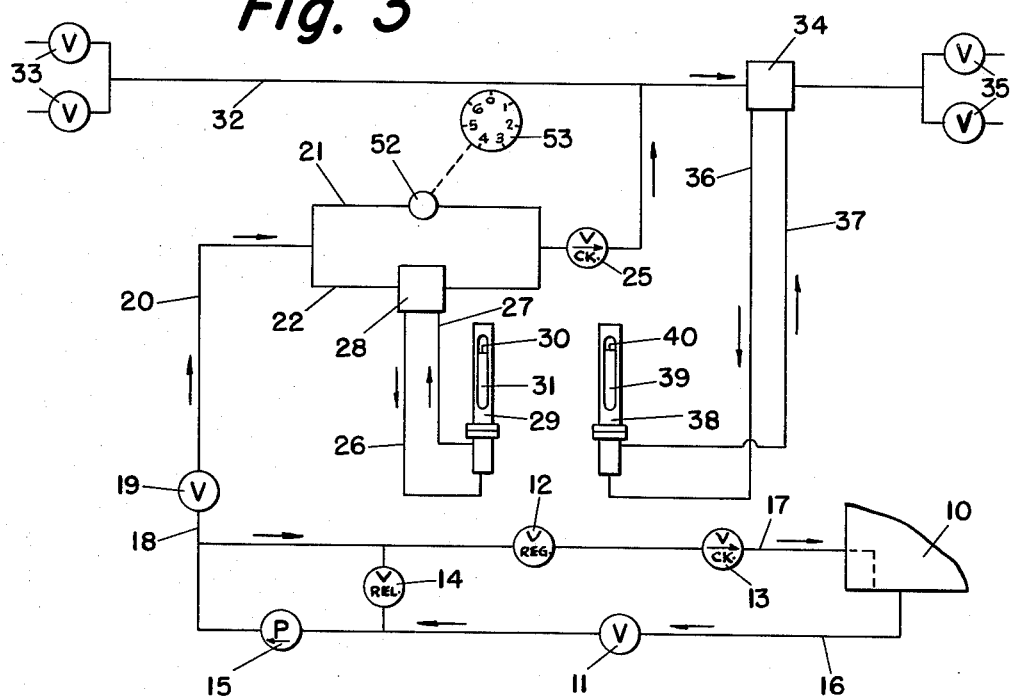
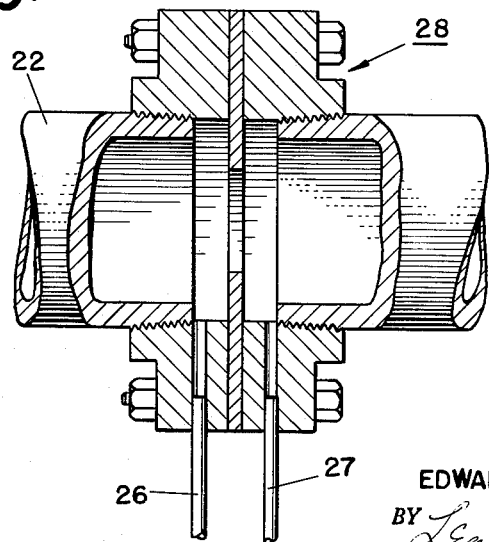
INVENTOR.
EDWARD C. HOLMES
BY
ATTORNEY

United States Patent Office 2,989,123
Patented June 20, 1961

2,989,123
FIRE EXTINGUISHING FOAM PROPORTIONING SYSTEM
Edward C. Holmes, West Chester, Pa., assignor to National Foam System, Inc., a corporation of Delaware
Filed May 8, 1959, Ser. No. 811,931
4 Claims. (Cl. 169—14)

This invention relates generally to fire-extinguishing apparatus and more particularly to an improved apparatus for continuously producing as required an aqueous solution of foam-forming liquid for use in the production of mechanical or air foam employed in the extinguishment of fires.

In the production of so-called mechanical or air foam, the usual procedure involves flowing a high velocity stream of water laden with a foam-forming substance through a conduit system to a point or points therein where the stream is finely subdivided or dispersed and where a suitable gas (usually air from atmosphere) is entrained in the finely divided stream to form the desired fire-extinguishing foam.

In order to insure the production of foam of the desired uniform quality, it is necessary that the rate of introduction of the foam-forming material (generally in the form of a prepared liquid) into the flowing stream of water be in constant fixed proportion to the rate of flow of the water. Ordinarily, water is available for continuous supply under adequate pressure to the conflagration to be extinguished, but not so the supply of foam-forming liquid which must be replenished for introduction into the flowing stream of water to produce the desired foam-forming solution.

Apparatus has been devised heretofore for producing mechanical or air foam substantially continuously and uninterruptedly over an extended period, as may be required for the extinguishment of an extensive fire requiring the production and use of a large quantity of foam-forming solution, one such apparatus being shown and described in United States Letters Patent No. 2,405,652, granted August 13, 1946. However, while in such apparatus the form-forming liquid is stored in two reservoirs which are alternately exhausted of and filled with the liquid for continuous injection thereof into the flowing stream of water with corresponding continuous production of fire-extinguishing foam, because of the fact that the foam-forming liquid is introduced into the water stream by the pressure differential existing between the opposite ends of a Venturi passage through which the water flows and which forces the foam-forming liquid from its reservoir into the water stream, such prior apparatus is necessarily restricted for most efficient operation to a foam discharge capacity which is more or less dependent upon its rated water input capacity.

Thus, it has been found that in such prior apparatus the proper proportioning of foam-forming liquid to water flowing through the Venturi passage cannot be maintained except for a limited range of water flow for which the Venturi passage is specifically designed. Also, because of the fact that in such prior apparatus, the foam-forming liquid is forced out of its reservoir into the water stream by the pressure of a head of water diverted from the stream for such purpose, any unused liquid remaining in the reservoir eventually becomes inseparably combined with the water directed thereinto as the expressing medium and consequently is of no further value and must be discarded as waste material.

Further, in prior apparatus, such as the above mentioned, the only indication that the reservoir has been completely exhausted of its supply of foam-forming liquid is that water alone is being discharged upon the fire. Where the foam-forming solution is being directed to a foam chute from which foam is discharged into the top of a burning oil tank or the like, even such indication is not available and it may be that some considerable time may elapse before it is realized that only water and not foam is being projected to the fire. Also, should the Venturi or other water and/or foam-forming liquid passages of the apparatus become partially clogged or should control valves in the foam discharge system be improperly set, the proportion of foam-forming liquid introduced into the flowing water stream may so vary from its proper value as to result in the production of foam which is of inferior quality or of inadequate volume.

In general the foam proportioning system according to the present invention is similar to that shown and described in the United States Patent 2,799,352, granted July 16, 1957, assigned to the same assignee as the instant application, and constitutes an improvement thereover. The apparatus taught in such patent is limited to the production of foam having a single fixed proportion between the water and the foam liquid combined to produce the foam-forming aqueous solution. Additionally, such system does not provide the optimum mixing between the water and foam liquid prior to delivery of the aqueous foam solution to the foam producing nozzles. As a consequence it has been found necessary to devise apparatus for overcoming these shortcomings by providing means to insure thorough mixing of the water and foam liquid, and also providing the ability to selectively vary between predetermined limits the proportion of foam liquid to water in the final solution.

Having in mind the foregoing, it is among the principal objects of the present invention to provide an apparatus which insures the continuous and uninterrupted production over an extended period of time of an aqueous foam-forming solution in which the proportion of foam-forming liquid may be constantly maintained at a selected predeterminedly fixed value regardless of fluctuations in the rate of flow of water through the apparatus.

A further important object of the present invention is to provide an apparatus having means for visually indicating any deviation from the desired predetermined fixed proportion of foam-forming liquid to water and for immediately varying, as may be necessary, the rate of flow of liquid introduced into the water stream to insure the continuous production of a properly proportioned foam-forming solution.

Still another object of the present invention is to provide an apparatus for producing a continuous and uninterrupted supply of a foam-forming solution containing an exactly proportioned amount of foam-forming liquid wherein the water and foam-forming liquid are respectively measured by complementally calibrated rate-of-flow indicators to provide an immediate indication of the proportion of liquid to water in the foam-forming solution as discharged from the apparatus for delivery to the foam-producing device or devices associated therewith.

Yet another object of the invention is to provide novel apparatus for selectively varying between predetermined limits the amount of foam liquid introduced into the water stream so as to produce an aqueous foam-forming solution containing a specific percentage of foam liquid.

The foregoing and other objects of the invention will become clear from a careful reading of the following specification in conjunction with an examination of the appended drawings, wherein:

FIGURE 1 is a diagrammatic illustration of one embodiment of the foam proportioning system according to the invention which shows the general organization thereof and one way of providing for establishing and maintaining the injection of different selected amounts of foam liquid into the water stream to produce foam solutions containing differing fixed percentages of foam liquid;

FIGURE 2 is a diagrammatic illustration of a second embodiment of the foam proportioning system according to the invention, similar to FIGURE 1, and showing means for injecting foam liquid into a water stream to produce foam solutions containing foam liquid in a proportion selectively continuously variable throughout a predetermined range;

FIGURE 3 is a diagrammatic illustration of a third embodiment of the foam proportioning system according to the invention;

FIGURE 4 is a detailed showing of a typical metering orifice such as those illustrated in diagrammatic form in the other figures.

In the figures like elements are denoted by like reference characters.

Turning first to FIGURE 1 for an understanding of the general organization of the foam proportioning system, there will be seen a pressurized foam liquid system consisting essentially of two sections, namely a supply and pumping section and, coupled thereto a metering section. The first section includes the tank 10 for storage and supply of a foam forming liquid, the valves 11, 12, 13 and 14, and a pump 15. The valve 11 is the main control which allows foam liquid to be drawn from the tank 10 through the outlet conduit 16 when the pump 15 is in operation. When the valve 11 is closed no foam liquid may be withdrawn from the tank 10 whereas when the valve 11 is open, the pump 15 and conduit 16 are placed in free intercommunication. The valve 13 is a check valve which permits foam liquid passing through the pump 15 to be returned to the tank 10 when the valve 12 is open, so that in such a case, foam liquid may circulate in a closed loop comprising the outlet conduit 16 from the tank 10, the valve 11, pump 15, valve 12, check valve 13, tank return conduit 17, and back into the storage tank 10.

The valve 12 is an adjustable foam liquid regulating valve which determines the pressure head built up by the pump 15 at the conduit line 18, which conduit 18 connects to a valve 19. Assuming for a moment that the valve 19 is completely closed so that there is a continuous circulation of foam liquid between the outlet conduit 16 and the return conduit 17 through the tank 10, it will be understood that as the valve 12 is restricted more and more, a back pressure will increasingly build up on the outlet side of the pump 15, so that an increasing differential pressure will be developed across the pump itself. In order to insure that this differential pressure across the pump 15 does not increase to a point which may cause damage to the pump or rupture of the conduit lines, a pressure relief valve 14 is shunted across the pump 15. Should the differential pressure increase toward a dangerous level, the pressure relief valve 14 automatically opens to thereby provide a parallel flow path directly around the pump, whereby the differential pressure across the pump 15 is held below the critical value. When the pressure differential is decreased, either by opening the valve 12 to a greater extent or by opening the valve 19 so that the high pressure in the line 18 may be vented through the latter, the relief valve 14 will automatically close down and only again open should the pump pressure differential increase to the critical point.

When now the valve 19 is opened, the foam liquid under pressure in the conduit 18 may pass therethrough and along a conduit 20 to a pair of parallel conduit branches 21 and 22. The conduit branch 21 includes a valve 23 in series with an orifice 24, the low pressure side of the orifice 24 being connected to the inlet of a check valve 25. The parallel conduit branch 22 conducts the foam liquid to and through a second orifice 28, the low pressure side of this orifice 28 being also coupled to the inlet of the check valve 25 previously described as being coupled to the low pressure side of the orifice 24. A conduit line 26 extends between the high pressure side of the orifice 28 and the inlet to a liquid flow meter 29, the foam liquid passing through the conduit 26 and liquid flow meter 29 being returned to the low pressure side of the orifice 28 by a conduit 27.

The outlet side of the check valve 25 is connected into a water manifold and allows the foam liquid passing through the orifices 28 and 24 to be injected into the water manifold while preventing the back flow of water from the manifold into the foam liquid conduit lines. The liquid flow meter 29 may be any one of the well known conventional types operated by a pressure head developed across the orifice 28 and hence between the conduit lines 26 and 27. Meter 29 of course must be provided with a suitable indicator capable of providing a measure of the flow rate through the meter and hence also providing the measure of the flow rate through the orifice 28. The indicator may be of the float type and is diagrammatically indicated to be such in FIGURE 1, the indicator 30 being visible through a window 31 and rising or falling according to the flow rate through the orifice 28.

Turning now to a consideration of the water system into which the foam liquid is injected by means of the aforementioned check valve 25, it will be observed that a source of water under pressure, as for example from a fire hydrant, may be connected to a water manifold 32 by means of the plurality of water inlet connectors 33. The water under pressure coursing through the manifold 32 passes the foam liquid injection point and through the orifice 34 to a plurality of hose discharge connections 35, to which latter may be connected hoses terminated in foam forming nozzles. A liquid flow meter 38 is connected across the orifice 34 by the conduits 36 and 37 in identically the same manner as that already described in connection with the liquid flow meter 29 in the foam liquid fluid circuit. Also as in the case of the liquid flow meter 29, the flow meter 38 is provided with a window 39 and an indicator 40.

In use, the meters 29 and 38 are placed immediately adjacent one another so that the indicators 30 and 40 may be instantly visually compared with regard to their level in respect to one another. It has been found in practice that it is most desirable to maintain the indicators 30 and 40 in horizontal alignment and independent of the desired proportioning between the water flowing through the manifold and the injected foam liquid. This is so because under the press of emergency conditions encountered during fire fighting, it is not practical to tell at a glance whether or not the desired proportioning is being maintained by reading a graduated scale on the meter windows, but rather it has been found that the indicators 30 and 40 should be maintained in a fixed relationship one to the other and the proportioning taken care of by other means. This permits deviations from the desired proportioning to be observed immediately by the simple expedient of noticing that the indicators 30 and 40 have deviated from their horizontal alignment.

Assuming that the indicator 40 of the flow meter 38 assumes the position indicated in response to the flow of water from the manifold 32 through the orifice 34, and further assuming that the indicator 30 of the flow meter 29 assumes its indicated position in horizontal alignment with the indicator 40 when a one percent aqueous solution of foam liquid is being delivered to the discharge connections 35, the following conditions will exist in the system. The valves 11 and 19 will be open, as will the check valves 13 and 25, the valves 14 and 23 will be closed, and the valve 12 will be open to a sufficient extent to cause a pressure head to be developed in the conduit 18 such that the foam liquid flow through the orifice 28 will raise the indicator 30 in the flow meter 29 to its illustrated position.

The size of the orifice 28 is of course determined by the sensitivity of the flow meter 29 and the size of the orifice 34. By way of illustration, if the flow meter 29 raises the indicator 30 to the illustrated position when one gallon per minute is passing through the meter, and it is desired that ten gallons per minute shall be delivered through the check valve 25, then the orifice size would be so chosen that when one gallon per minute is flowing through the flow meter 29 nine gallons per minute would be flowing through the orifice 28, so that the total gallonage flowing through the check valve 25 would be ten gallons per minute. Similar conditions of course will determine the size of the orifice 34 associated with the flow meter 38.

When it is desired that the aqueous foam forming solution arriving at the discharge connections 35 shall be a one percent solution, then it necessarily follows that one part of foam liquid must be injected into the water manifold 32 for each ninety-nine parts of water passing the injection point. The orifices 28 and 34 are therefore proportioned one to another so that the indicators 30 and 40 assume their indicated positions when this condition is met. Should the indicator 30 tend to rise above the position of the indicator 40, then the valve 12 may be partially opened to increase the flow therethrough and hence reduce the flow through the orifice 28, resulting of course in a drop in position of the indicator 30 in the flow meter 29 by virtue of the fact that the differential pressure across the orifice 28 and between the conduit lines 26 and 27 is reduced. Alternatively, although not preferably, the valve 19 could be somewhat closed to reduce the pressure head in the conduit 20 by allowing more of the foam liquid under pressure at the outlet of the pump 15 to return to the storage tank 10.

If now instead of a one percent solution, it is desired to provide a two percent solution, then the valve 23 in the parallel branch 21 may be opened so that foam liquid passing through the conduit 20 may, in addition to passing through the parallel branch 22 and orifice 28, also pass through the branch 21 and orifice 24. When the orifice 24 is of the same cross sectional area as the orifice 28 twice as much foam liquid will be injected into the water manifold and hence the percent of aqueous foam solution would be doubled while maintaining the indicator 30 in the flow meter 29 in exactly the same position.

If additional one percent increments are desired, then additional parallel branches similar to the parallel branch 21 may be utilized, each of the additional parallel branches including its own valve in series with its own orifice, the valves being opened one at a time as desired to provide the increased percentage of foam liquid injected into the water manifold. Alternatively of course some of the parallel branches may have orifices which would increase the foam liquid concentration to provide increments of more than one percent, as for example a two percent orifice or a three percent orifice. It should now be apparent that aqueous foam solutions of any desired concentration may be formed by the suitable employment of parallel branches each employing a control valve and an orifice.

The foregoing described proportioning system has several very important advantages over previously known systems. One important consideration is of course the ability to provide aqueous foam forming solutions of various concentrations, that is, solutions including different desired proportions of foam liquid and water. Another advantage of major importance is that previously the foam liquid was injected into the water manifold on the low pressure side of the orifice 34 and hence travelled only a very short distance before encountering the discharge connection 35. This resulted in sometimes incomplete mixture of the foam liquid with the water and tended to produce a non-uniform foam. By injecting the foam liquid on the high pressure side of the orifice 34 and directly into the water manifold 32 as indicated in FIGURE 1, a much longer mixing path is provided combined with the fact that the injected foam liquid and water are caused to pass together through the orifice 34 which introduces a certain amount of turbulence and hence improves the mixing. The flow meter 38 of course responds to the mixture of water and injected foam liquid, and not merely to the water alone, so that the indicators 30 and 40 will truly show the proportion of the foam liquid to aqueous foam forming solution rather than the proportion of foam liquid to water. Hence, the metering is much more accurate.

Turning now to the foam proportioning system illustrated in FIGURE 2, it will be observed that the organization and operation are essentially identical to that illustrated in FIGURE 1 with one exception. This exception resides in a change in the orifice arrangement of the foam liquid system between the conduit 20 and the check valve 25 to provide the ability to continuously vary the proportion of foam liquid injected into the water manifold. The continuous variation is achieved by replacing all of the parallel branches such as 21 and 22 of FIGURE 1 with a single valve 50 which is calibrated and used as a variable orifice. Secured to the valve 50 and rotatable as the valve is opened and closed is a calibrated indicator 51 which provides an easily visible index of the orifice aperture and therefore renders possible the setting of the orifice 50 to the desired aperture corresponding to the desired proportional injection of foam liquid into the water manifold 32 via the check valve 25.

It will be noted that the calibrated indicator 51 shows that the minimum aperture would correspond to a one percent injection of foam liquid into the water manifold 32. Hence, when the valve 50 is opened so that the indicator shows a one percent foam liquid injection, the indicator 30 in the flow meter 29 is brought into horizontal alignment with the indicator 40 in the flow meter 38 by adjustment of the valve 12 to provide the proper head of pressure in the conduit 20. When now it is desired to increase the percent injection, as for example to four percent, the variable orifice valve 50 is opened further so that the four percent indicator on the calibrated indicator 51 marks the orifice opening. The indicator 30 in the liquid meter 29 will of course tend to drop out of horizontal alignment with the indicator 40 in the flow meter 38, but the indicator 30 may be raised to its proper alignment condition by closing down somewhat on the valve 12 to increase the head pressure in the conduit 20. A similar procedure would be utilized to obtain any other desired percentage injection of foam liquid. Of course, although the indicator 51 is seen to show the numerals 1 through 6, it will be appreciated that any desired range could be covered by the utilization of a variable orifice valve 50 of the proper aperture range.

Turning now to the foam proportioning system illustrated in FIGURE 3, it will again be observed that the organization and operation are essentially identical to the systems illustrated in FIGURES 1 and 2 but differ therefrom in a slightly different orifice arrangement located between the conduit 20 and the check valve 25. This arrangement is similar to the showing of FIGURE 1 in that the branch 22 including the fixed orifice 28 is retained, and the liquid flow meter 29 is operated by this orifice 28. However, all of the parallel branches, such as 21 of FIGURE 1 which each include a valve and fixed orifice corresponding to the valve 23 and orifice 24 as illustrated in FIGURE 1, have been replaced by a single valve 52 calibrated and used as a variable orifice in a similar manner to the valve 50 shown in FIGURE 2. Secured to the valve 52 and rotatable as the valve is opened and closed is a calibrated indicator 53 which corresponds in function to the calibrated indicator 51 in the showing of FIGURE 2.

The sole difference between the valves 50 and 52 resides in the fact that whereas the valve 50 of FIGURE 2 shows a minimum aperture corresponding to a one percent foam liquid injection, the valve 52 of FIGURE 3 has a zero indicator which denotes that the valve 52 may be completely shut, and of course when so shut results in the total flow of foam liquid being required to pass through the fixed orifice 28 across which the liquid flow meter 29 is connected. With such an arrangement, the fixed orifice 28 would be chosen to pass the minimum percentage of foam liquid desired to be injected into the water manifold 32, all incremental increases then being obtained by suitable opening of the variable orifice valve 52. The level of the indicator 30 in the flow meter 29 would of course be adjusted to its proper position by suitable operation of the valve 12 as already described in connection with the showing of FIGURE 2.

FIGURE 4 illustrates a metering orifice such as that shown at 28 in FIGURES 1 and 3. A similar structure would be employed with regard to the orifice 34 in the water line 32, as shown in FIGURES 1, 2 and 3. The fixed orifice 24 illustrated in the showing of FIGURE 1 is not provided with the conduit lines 26 and 27 as illustrated in FIGURE 4 since this orifice is not a metering orifice.

Having now described my invention with respect to particularly illustrated embodiments thereof, it will be appreciated that various modifications and changes will now occur from time to time to those persons normally skilled in the art without departing from the essential spirit or scope of my invention, and it is therefore intended to claim the invention broadly as well as specifically, as indicated by the appended claims.

What is claimed as new and useful is:

1. Apparatus for producing a fire-extinguishing foam-forming solution comprising means for flowing a stream of water under pressure to a foam producer, said means including a main conduit having a reduced diameter orifice for establishing a pressure differential between the upstream and downstream sides of said orifice, a flow rate indicator connected to said water conduit in by-pass relation to said orifice and having means for visually indicating that the flow through said orifice is at a desired rate, means for introducing a foam-forming liquid under pressure into said main conduit to produce a foam-forming solution including a secondary conduit also having a reduced diameter orifice for diverting a predeterminedly proportioned amount of said foam liquid through a by-pass line connected to said secondary conduit across its reduced diameter orifice, and a foam-forming liquid flow rate indicator connected in said by-pass line and having calibrated indicating means for visually indicating by comparison with the indicating means of the main conduit flow rate indicator whether or not the foam-forming liquid and water are being combined in a predeterminedly fixed proportion, and calibrated means for selectively varying as desired the percentage of foam-forming liquid introduced into the water stream, said last-mentioned means including a plurality of secondary conduit branch lines and means for selectively connecting one or more of said branch lines to the main conduit, each branch line having therein a reduced diameter orifice which bears a predetermined calibrated relationship to the orifice across which is connected the foam-forming liquid flow rate indicator, whereby said foam-forming liquid flow rate indicator is enabled to meter the flow through the sum of all of said secondary conduit branches which are connected to the main conduit, and regulating means for regulating the supply of foam-forming liquid under pressure to the main conduit through said secondary conduit and its operative branches, said regulating means being operably effective to maintain the indicating means of the foam-forming liquid flow rate indicator in constant relationship to the indicating means of the main conduit flow rate indicator regardless of the number of secondary conduit parallel branches that are connected to the main conduit at a given time.

2. The apparatus as defined in claim 1 wherein the indicating means of said flow rate indicators respectively comprise movable elements which, when in substantially horizontally aligned relation, visually indicate that the foam-forming solution is of the desired liquid-water ratio, and wherein the aforesaid foam-forming liquid supply regulating means is effective to adjust the flow of liquid through said foam-forming liquid flow rate indicator to maintain its movable indicator in horizontally aligned registry with that of the main conduit flow rate indicator to thereby visually indicate that the desired liquid-water ratio is being maintained.

3. The apparatus according to claim 1 wherein each secondary conduit branch orifice bears a fixed relationship to the orifice across which is connected the foam-forming liquid flow rate indicator.

4. The apparatus according to claim 1 wherein at least one of said secondary conduit branch orifices includes calibrated means for manually variably selecting the flow rate relationship between its branch orifice and the orifice across which is connected the foam-forming liquid flow rate indicator.

References Cited in the file of this patent

UNITED STATES PATENTS

| | | |
|---|---|---|
| 1,055,063 | Meriam | Mar. 4, 1913 |
| 1,926,413 | Tibbs | Sept. 12, 1933 |
| 2,013,113 | Simpson | Sept. 3, 1935 |
| 2,630,820 | Gray | Mar. 10, 1953 |
| 2,799,352 | Boerner et al. | July 16, 1957 |
| 2,862,387 | Webster | Dec. 2, 1958 |